G. E. HOWARD.
METHOD OF GATHERING MOLTEN GLASS.
APPLICATION FILED AUG. 3, 1915.
1,231,610. Patented July 3, 1917.
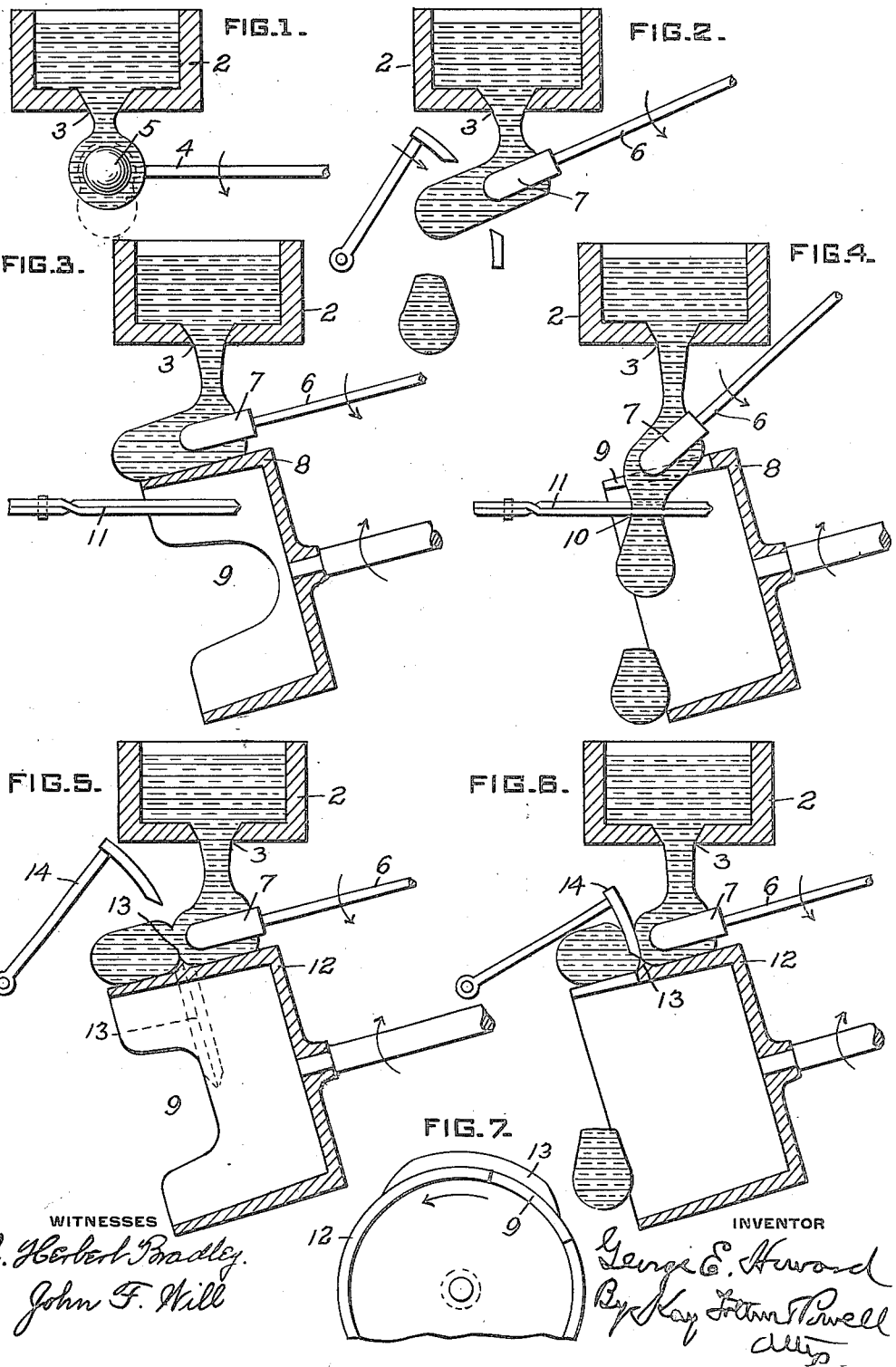

UNITED STATES PATENT OFFICE.

GEORGE E. HOWARD, OF BUTLER, PENNSYLVANIA, ASSIGNOR TO HOWARD GLASS FEEDER COMPANY, OF BUTLER, PENNSYLVANIA.

METHOD OF GATHERING MOLTEN GLASS.

1,231,610.   Specification of Letters Patent.   Patented July 3, 1917.

Application filed August 3, 1915. Serial No. 43,437.

*To all whom it may concern:*

Be it known that I, GEORGE E. HOWARD, a citizen of the United States, and resident of Butler, in the county of Allegheny and State of Pennsylvania, have invented a new and useful Improvement in Methods of Gathering Molten Glass; and I do hereby declare the following to be a full, clear, and exact description thereof.

My invention relates to a method of gathering glass for forming articles of glassware in automatic or semi-automatic machines.

In order to clearly present the process I employ in my method, it is necessary to consider some of the physical properties of glass and trace the necessary treatment of the glass to get best results in order to show that the principle employed by me enables me to secure these results.

Glass is a peculiar substance, and according to the best authorities, it is not a solid, but its hardness, softness and fluidity are only relative degrees of fluidity. Thus even at low temperature and apparently hard and brittle, it is still a fluid with a high viscosity.

It is not crystalline in structure, and any crystals seen in glass are due to excess material in uniting and are accidental impurities although transparent.

As its temperature rises, glass passes through different stages of viscosity and certain of these stages are so clearly defined that we erroneously speak of them as the hardening stage, the softening stage, the flowing stage, and the liquid stage, which terms however, will be used by me as being better understood by the trade, in place of the real facts of their being really relative stages of viscosity or fluidity.

When glass is in the soft stage, it is highly viscous and ductile, and this is the proper stage for blowing, drawing or rolling to give maximum strength, and further it does not chill or crack when in momentary contact with a cold substance, such as a mold. At this stage, too, the change in viscosity is proportional to temperature, through a comparatively long range. At a lower temperature stage it goes from hard to soft through a short range of temperature. Again, at a higher temperature stage, it goes from high viscosity and ductility to a low viscosity or liquid stage, within a comparatively short range of temperature. It is obvious that all working of glass should be confined as nearly as possible to this soft or ductile stage.

Another property to be noted is that in common with other fluids or viscous substances, a mass or body of glass by being worked or kneaded will tend to rapidly equalize in temperature and viscosity by the inter-working of its particles in the mass in addition to the equalization by mere contact alone. Thus glass of different temperatures and degrees of viscosity which is suddenly poured into a receptacle and remains at rest, requires considerable time to equalize the mass by the convection of heat, for glass is low in conductivity. But, if the mass is kept in motion, as for instance, the way a mass on a gatherer's punty is kept turning, and the mass of glass in constant motion, then it rapidly equalizes its internal temperature and condition. The outside of the mass, however, forms a skin as it is chilled and does not work in and out of the mass like the particles in the interior.

Another physical property of molten glass is its action in contact with the cold open structure of a finishing mold. If too hot and liquid it takes a close impression of the surface of the mold and loses its luster or polish, while, if chilled or cooler, it does not so readily reproduce the surface imperfections and tool marks of the mold.

This is noticed in ware that needs high polish, such as tumblers. In hand blown tumblers, the glass is marvered or chilled on its surface before touching the mold, and therefore has a high polish. Machine made tumblers which receive hotter glass in the mold are dull and have to be fire finished to give luster.

Again, iron is porous and even when polished highly, hot glass brought in contact with it, will fill itself with bubbles, which will appear in the form of blisters in the finished glass, while glass slightly cooler will be free from such bubbles. This is noticed especially in plate glass when poured too hot.

In flowing glass through an opening from a receptacle containing the glass for purposes of gathering, the glass has to have high temperature and low viscosity in order to keep a regular even flow and at this temperature it is too hot for working or bringing in contact with iron molds. In the present practice most commonly employed, where a flowing stream is used, this is accomplished by cutting off the freely flowing stream and letting it accumulate in the cutting chamber, while molds are changed, then dropping this stringy mass into the mold and in addition permitting a portion of the hot stream, which has not come into contact with the cold iron at the cutting chamber, to enter the mold. As the glass is immediately pressed and blown, the different particles have had no chance to equalize and the ware produced is very liable to be full of blisters, lumps, bubbles, strings, etc., and possesses a poor polish. To make it worse, the contraction in a freely flowing stream of glass is very great, and as the outside rapidly chills, this waving stream falls into the mold and traps many bubbles by mechanical action.

By my method, I do not sever or cut the freely flowing stream, but retard its flow, and thus prevent its contraction so that it falls on the collector in a thick, even stream. Instead of collecting glass in a collecting chamber and afterward dropping it out into the mold, I employ a hot collecting punty which never breaks its contact with the flowing stream during operation, and which can be placed close up to the opening where there is no great contraction in the flowing stream. By rotating the collector or punty, the glass is collected thereon and builds up a mass or gob of even consistency. Upon stopping the rotation of collector, the mass falls off in a gob, stretching from the original mass in such a way as to form a narrow portion where cutting off takes place. Collector can be again rotated picking up the tail or contracted portion above the cutting place and building it up on the collector, together with the glass flowing upon collector from containing receptacle and the operation repeated.

As a modification, the collector can have an oblong head inclined downwardly so that the glass builds up on the collector, and gradually works toward the point or end and during rotation will extend itself beyond the end of collector for a greater or less distance without dropping off. The diameter and length of this projected portion is governed by the temperature of the glass, the rate of rotation of collector, diameter length of collector head, and inclination of axis of collector.

Again, the inclination of axis of collector can be changed during operation to assist the action. Again, the glass can be rolled on a marvering element to further assist the evening up of the glass and its elongation.

These and other modifications of any particular means for carrying out my method, some of which are illustrated by the accompanying drawings, can be employed to best utilize the principle of my method.

The choice of any particular means will depend upon the kind of glass, shape or size of article to be fashioned, etc.

In the accompanying drawing, I have illustrated suitable apparatus for carrying out my invention, in which Figure 1 shows one form of apparatus in which a punty with a spherical end portion is employed; Fig. 2 shows another form of apparatus; Figs. 3 and 4 show an oblong punty and a marver; Figs. 5, 6 and 7 show still another form of apparatus in which the contracted or narrow portions of the gob of glass is formed by the action of the marver.

In Fig. 1 the numeral 2 designates a suitable receptacle containing molten glass having the discharge opening 3 from which the glass is discharged in a continually flowing stream. In line with the opening 3 and in position to receive the glass and retard its movement, is the punty 4 with the spherical end portion 5. The punty may be rotated by hand or suitable power. It will be apparent that as the punty rotates the glass will be built up by the axial rotary movement and the mass or gob of glass may be allowed to stretch or elongate by stopping the movement, as indicated in dotted lines Fig. 1, and as said glass elongates, it may be cut off with suitable shears and dropped in a mold, the sizes of the gob having been predetermined by the size of opening in containing vessel and the time between cutting periods.

In Fig. 2 I have illustrated my method in connection with a punty 6, with an oblong head, which is held in position to retard the flowing stream of glass and to project a portion beyond the end of head at which point it can be severed at suitable intervals.

In Figs. 3 and 4, I have illustrated my method in connection with a punty 6, with an oblong head 7, which is held in position to retard the flowing stream of glass, and in addition there is the marver 8 by which the glass is supported. This marver 8 is adapted to be rotated and, as the punty is being rotated simultaneously, the action will be to hold the glass upon the marver, the said marver acting to form a skin upon the body of the glass, while rotating punty temporarily retards the movement of the glass, and the marver is provided with the opening 9, in its periphery, so that when the marver has been rotated until the opening 9 is brought in position to register with the body of glass, the glass will drop through said opening, as indicated in Fig. 4, and as the glass drops it will contract or narrow up as at 10, and at this point the shears 11 cut off the gob which is allowed to drop to the mold below. The marver assists the mass of glass on the punty in evening its consistency, and also serves to shape the gathered portion into any desired form. It serves also to keep the mass of glass in an even body with a chilled covering or skin that is unbroken. The marver and punty have a rolling contact with each other, and as described, at certain intervals the marvered and shaped glass is cut by cutting mechanism properly timed and the gob of glass of predetermined shape and quantity is cut off and dropped into a mold for pressing a blank or article to be fashioned or for pressing blanks and blowing articles.

While it is possible to give any predetermined shape to the gathered portion by means of the character of the surface of the marver, ordinarily and preferably the gathered portion when cut off will be cylindrical or conical and variation therefrom will be largely a matter of relative length and thickness.

It is important that the envelop or skin of the gathered portion, which is chilled so as to avoid taking the impression of the fine imperfections on the surface of the mold, be not broken although it can be forced into any shape, but the surface of the gathered portion should correspond to the surface of the finished article.

It is apparent that when the gathered portion is severed this envelop or skin will be broken and the knife may, in case of a large thick gather, cause a sharp corner which would show in the finished ware. To obviate this, I contract the part of the gather where it is sheared, and leave only a small section to be severed, so small as to cause no defect and prevent any sharp edge or lack of symmetry to the gathered portion.

In Figs. 5, 6 and 7, I have indicated means for contracting or narrowing the glass before it is cut, and in this case the marver 12 has at intervals on its periphery, the cam portions 13 so that as the marver is rotated, these cam portions will act as indicated in Figs. 5 and 7 to cut into the glass and form a contracted portion, so that when the knife 14 is lowered, the section to be severed will be very much reduced over the thickness of the body portion of the gob or gather.

What I claim is:

1. The method of gathering glass from a flowing stream which consists in maintaining a collecting member in contact with the flowing stream, gathering the glass thereon and simultaneously therewith marvering the same.

2. The method of gathering glass from a flowing stream which consists in maintaining a collecting member in contact with the flowing stream, loading up glass thereon by axial rotary movement, and simultaneously marvering the same.

3. The method of gathering glass from a flowing stream, which consists in maintaining a collecting member in contact with the flowing stream, retarding the elongation of the glass by the rotary movement of said collecting member, and simultaneously marvering the glass.

4. The method of gathering glass from a flowing stream, which consists in maintaining a collecting member in contact with the flowing stream, retarding the flow of glass by the rotation of said member, simultaneously marvering the glass, and contracting the glass at a certain point and then cutting the same.

In testimony whereof, I, the said GEORGE E. HOWARD, have hereunto set my hand.

GEORGE E. HOWARD.

Witnesses:
  JOHN F. WILL,
  S. F. ARMSTRONG.